Oct. 18, 1932.  G. D. GILLESPIE  1,883,691
BEET HARVESTER AND POTATO DIGGER
Filed June 13, 1930   2 Sheets-Sheet 1
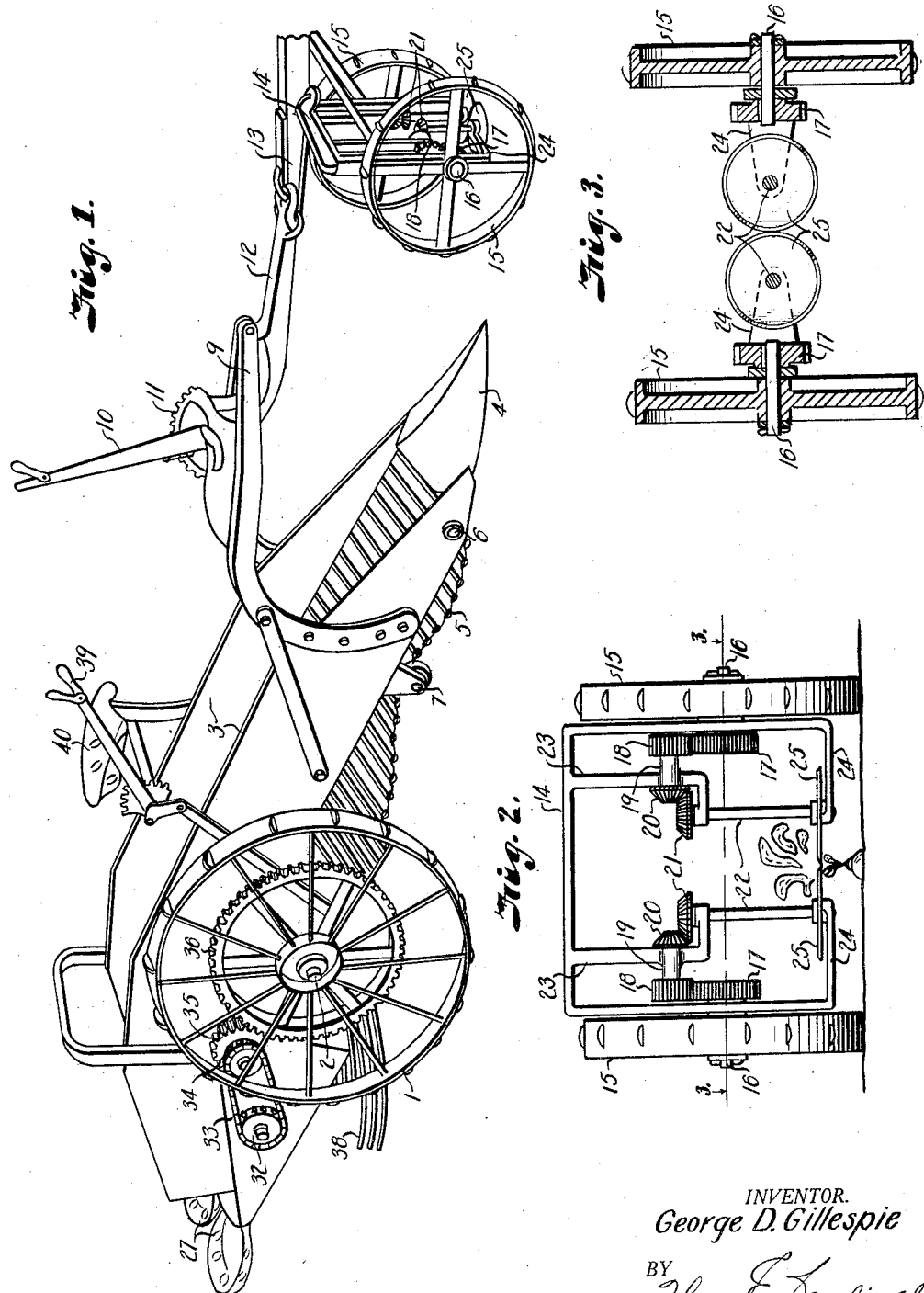
INVENTOR.
George D. Gillespie
BY
ATTORNEY.

Oct. 18, 1932.  G. D. GILLESPIE  1,883,691
BEET HARVESTER AND POTATO DIGGER
Filed June 13, 1930   2 Sheets-Sheet 2
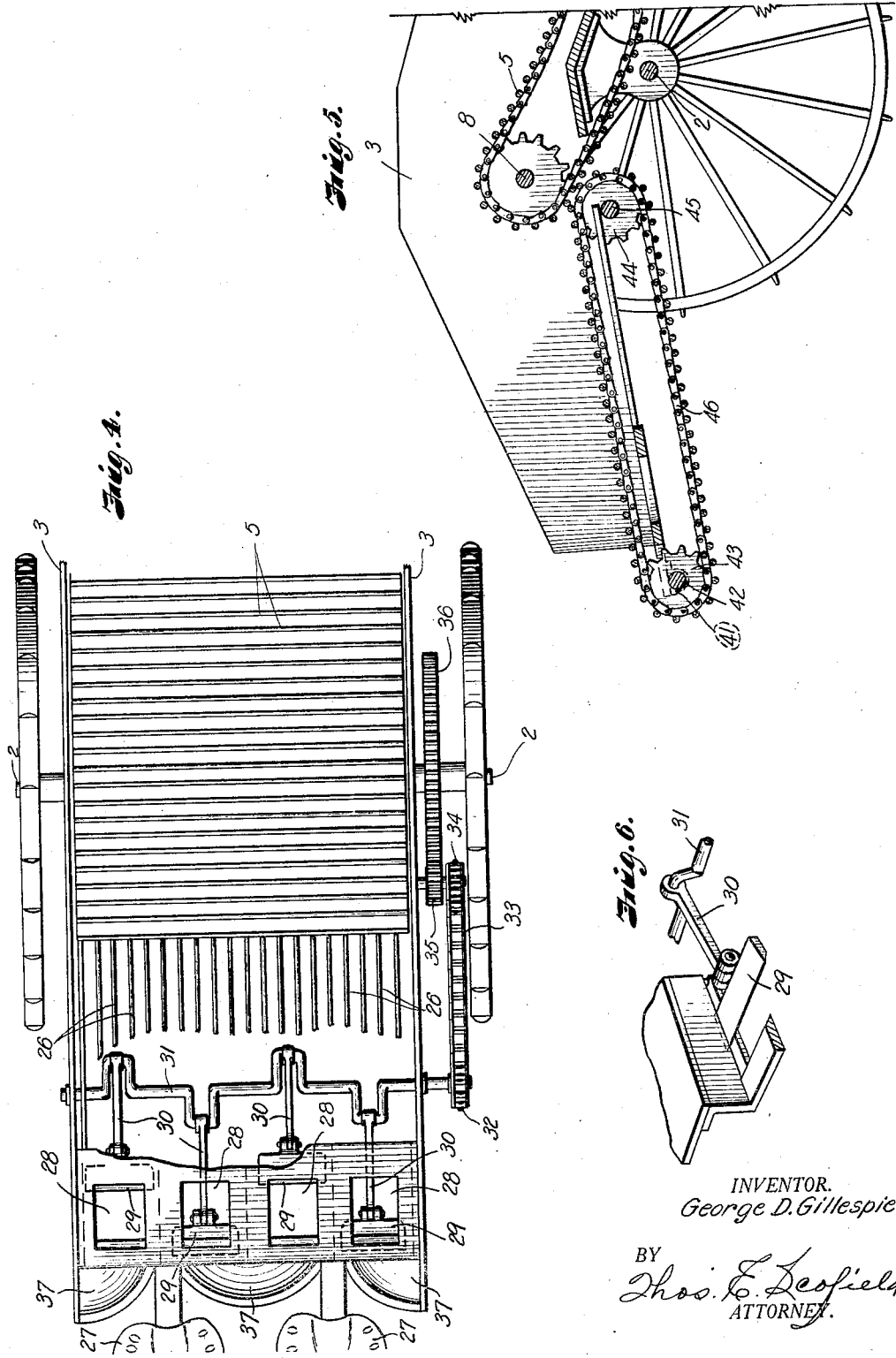
INVENTOR.
George D. Gillespie
BY
Thos. E. Scofield
ATTORNEY.

Patented Oct. 18, 1932

1,883,691

UNITED STATES PATENT OFFICE

GEORGE D. GILLESPIE, OF KANSAS CITY, MISSOURI

BEET HARVESTER AND POTATO DIGGER

Application filed June 13, 1930. Serial No. 460,913.

This invention relates to improvements in a beet harvester and potato digger, and refers more particularly to a machine which can be very easily changed in order that it may be used as a beet harvester or as a potato digger.

Among the important objects of the invention are to provide a machine, when used as a beet harvester, which first tops the beet leaves, leaving a short length of stem, then digs the beets and conveys them to the operators who cut the remaining stems from the tops of the beets so that they are in condition to be shipped to sugar beet factories. There is further provided by this machine a potato digger or harvester, by means of which the potatoes are dug from the soil and thereafter distributed by means of a conveyer on the ground behind the machine.

Fig. 1 is a side perspective view of the machine ready to be used as a beet harvester.

Fig. 2 is an elevational view of the front trucks showing the rotating knives for cutting the tops or leaves from the beets.

Fig. 3 is a view taken along the lines 3—3 in Fig. 2.

Fig. 4 is an enlarged plan showing the topping platform and cutting mechanism for removing the beet stems.

Fig. 5 is a fragmentary view of the rear of the machine when used as a potato digger.

Fig. 6 is a perspective detail of the cutting mechanism for severing the beet stems from the beets.

Referring to the drawings, the machine as shown in Fig. 1 is supported by ground wheels 1, rotating on an axle 2. The axle supports a frame to which are affixed the sides 3 of the chute. This frame comprises any suitable supporting structure carried by the axle and adapted to support the sides 3, it being obvious that many forms of frame work may be used. At the front end of the frame is positioned a plow share 4 and within the chute 3 is a conveyer 5 operating over suitable rolls or sprockets supported by the shafts 6, 7, and 8. At the front end of the machine is a support 9 which carries the lever 10, adjustable on a quadrant 11. This manually operated lever, through connections not shown, raises and lowers the plow share to the desired height so that it can be raised above the ground when the machine is in transit from place to place or when it is being turned around in the field, or can be lowered when the vegetables are to be dug. The plow share, including the means for adjusting its height, as well as the conveyer, are all well known mechanisms in the art.

The support 9 through a detachable connection 12 is supported by the member 13 on the front truck frame 14. This frame is carried by ground wheels 15, rotating upon axles 16. Fixedly mounted upon the axle 16 are gears 17 which mesh with pinions 18, mounted upon the stub shafts 19. On the opposite ends of these stub shafts are bevel gears 20 meshing with bevel gears 21 upon the vertical shafts 22 which are supported as are the shafts 19 by the brackets 23. The lower ends of the shafts 22 bear in brackets 24 which constitute a portion of the front truck frame 14. Near the lower end of the shafts 22 are disk cutters 25 which are positioned so that their cutting edges substantially contact and, when they are run along over a row of beets, they sever the top leaves of the beets, leaving a short length of stem at the top of the beets as shown in Fig. 2.

After being topped in the manner shown in Fig. 2 the beets are dug by means of the plow share 4, and deposited on the conveyer 5. By means of this conveyer, the beets are deposited on to the platform 26, shown in Fig. 4. This platform is preferably a series of spaced apart slats or steel bars, the openings between the bars permitting the dirt, or any leaves, sticks or stones, to separate from the vegetables.

Two operators seated at 27, Fig. 4, manually remove the beets from the platform and cut the remaining stems from the beets by inserting them in the wells or openings 28 in which are reciprocated cutting knives 29 which slide back and forth due to the connecting rod connections 30, mounted upon the crank shaft 31. This crank shaft is supported on the frame of the machine and has mounted on one end a gear 32 driven by means of a sprocket 33 receiving its power from a gear 34 mounted upon a stub shaft, upon which is also mounted a pinion 35. This latter pinion meshes with the gear 36, carried by the axle 2, upon which rotate the ground wheels and upon which the ground wheels are fixedly mounted.

As suggested, the operators manually select the beets from the stationary separating and beet receiving platform 26, upon which they are deposited by the traveling conveyer 5, and insert the beets, tops downwardly into the wells 28 so that the knives 29 will shear from the tops of the beets the stems left on the beets by the cutters 25 on the front trucks. The tops may be collected in a tray positioned beneath the cutting knives (not shown) or may be allowed to drop to the ground. After these stems have been cut from the beets, the beets are placed in the chutes 37 and accumulated upon a dumping rack 38. From time to time the beets accumulated on the rack are dumped by means of a lever 39, manipulated by the operator seated at 40. The dumping lever 39 may be positioned near one of the operators seated at 27 in place of the position shown above the conveyer chute 5, in which event one of the operators at the rear of the machine could dump the rack in place of the operator seated at 40.

The means for driving shaft 8 and conveyor 5, the means for operatively connecting lever 39 with dumping rack 38, the means for fastening the platform 26 and the beet topping assembly to the sides 3, the means for driving shaft 45 of the potato conveyor and the framework are only conventionally and more or less diagrammatically shown, inasmuch as these will be obvious to those skilled in the art, and admit of many changes in construction within the scope of my invention.

When the machine is to be used as a potato digger, the platform 26, as well as the cutting mechanism for removing the stems of the beets is removed from the frame. There are also taken off of the machine the seats 27 and the chutes and dumping rack 38. The drive mechanism, including the sprocket chain 33 and the crank shafts are disassembled. On the rear of the frame is attached a bearing 41, and in this bearing is mounted a shaft 42 which carries sprockets 43. Similar sprockets 44 are mounted upon the shaft 45, which carries the pinion gear 35. A conveyor 46 is then placed over the sprockets and rolls carried by the shafts 42 and 45 respectively. This conveyor 46 receives the potatoes which are deposited thereon from the conveyer 5, and distributes them evenly upon the ground behind the machine as it moves through the field.

When operated as a potato digger, the cutters 25 sever the vines, including the leaves and stalks, from the potatoes so that they are relatively free from vines, as well as dirt and stones, when deposited behind the machine from the conveyer 46.

It is obvious that the converting of the machine from a beet harvester to a potato digger can be readily done by the removal or remounting of the cutting mechanism for removing the beet stems.

Heretofore, when the topping of the beets has been done solely by the front cutters, it has been difficult to position properly the height of the cutters so that they would cut all beets evenly and avoid the nuisance of continuously cutting either too much or too little of the stems. The present cutters are positioned above the beets to leave a portion of the stem which is subsequently cut by the operators stationed at the rear of the machine.

I claim as my invention:

1. A combined beet harvester and potato digger, comprising a frame mounted on ground wheels, a front truck supporting the front of the frame, cutters on the front truck for topping the beets, a plow share and a stationary separating and beet-receiving platform, and a traveling conveyer communicating therebetween, cutters adjacent the separating platform for removing the remaining portion of the beet tops, chutes for receiving said topped beets and means for positioning operators adjacent the platform for feeding the beets to the cutters and thence to the chutes.

2. A combined beet harvester and potato digger, comprising a frame mounted on ground wheels, a plow share and a stationary beet-receiving platform having a traveling conveyer therebetween mounted on a frame, reciprocating cutters adjacent the platform for severing the beet tops from the beets.

3. A combined beet harvested and potato digger, comprising a frame mounted on ground wheels, a plow share and a stationary beet-receiving platform having a traveling conveyer therebetween mounted on a frame, reciprocating cutters adjacent the platform for severing the beet tops from the beets, chutes and a manually operated dump rack adjacent the platform.

4. A combined beet harvester and potato digger, comprising a frame mounted on ground wheels, a plow share and a stationary beet-receiving platform having a conveyer therebetween, mounted on a frame, seats at the rear of the frame positioned so that the operators face the end of the conveyor, reciprocating cutters driven from the ground wheels adjacent the platform and in front of the operators for severing the beet tops from the beets.

5. A combined beet harvested and potato digger, comprising a frame mounted on ground wheels, a plow share and separating platform having a conveyer therebetween, mounted on a frame, reciprocating cutters adjacent the platform, driven from the ground wheels, for severing the beet tops from the beets, chutes and a manually operated dump rack adjacent the platform, and means for positioning operators adjacent the platform for feeding the beets to the cutters and thence to the chutes.

In testimony whereof I affix my signature.

GEORGE D. GILLESPIE.